INVENTOR
JAMES H. ANDERSON

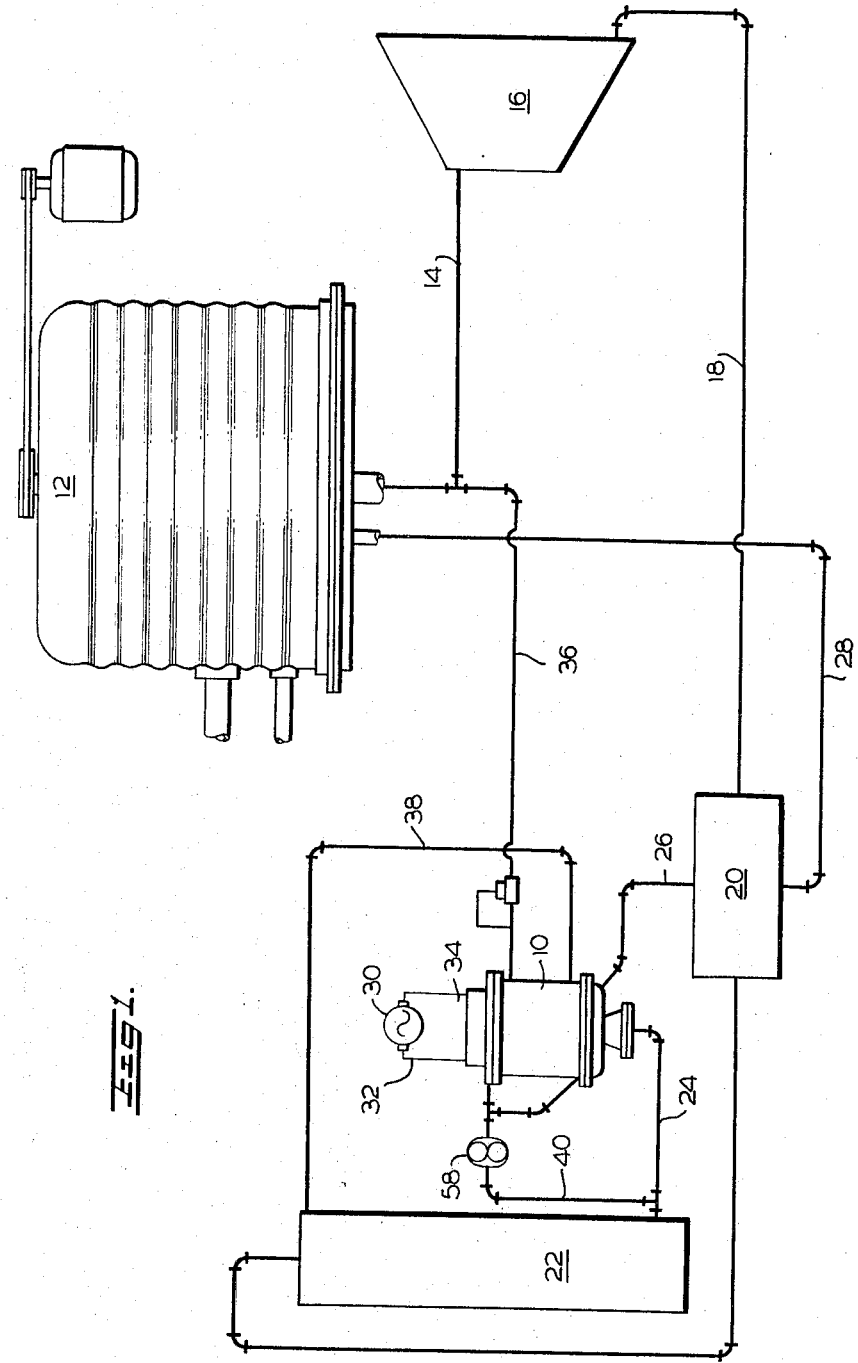

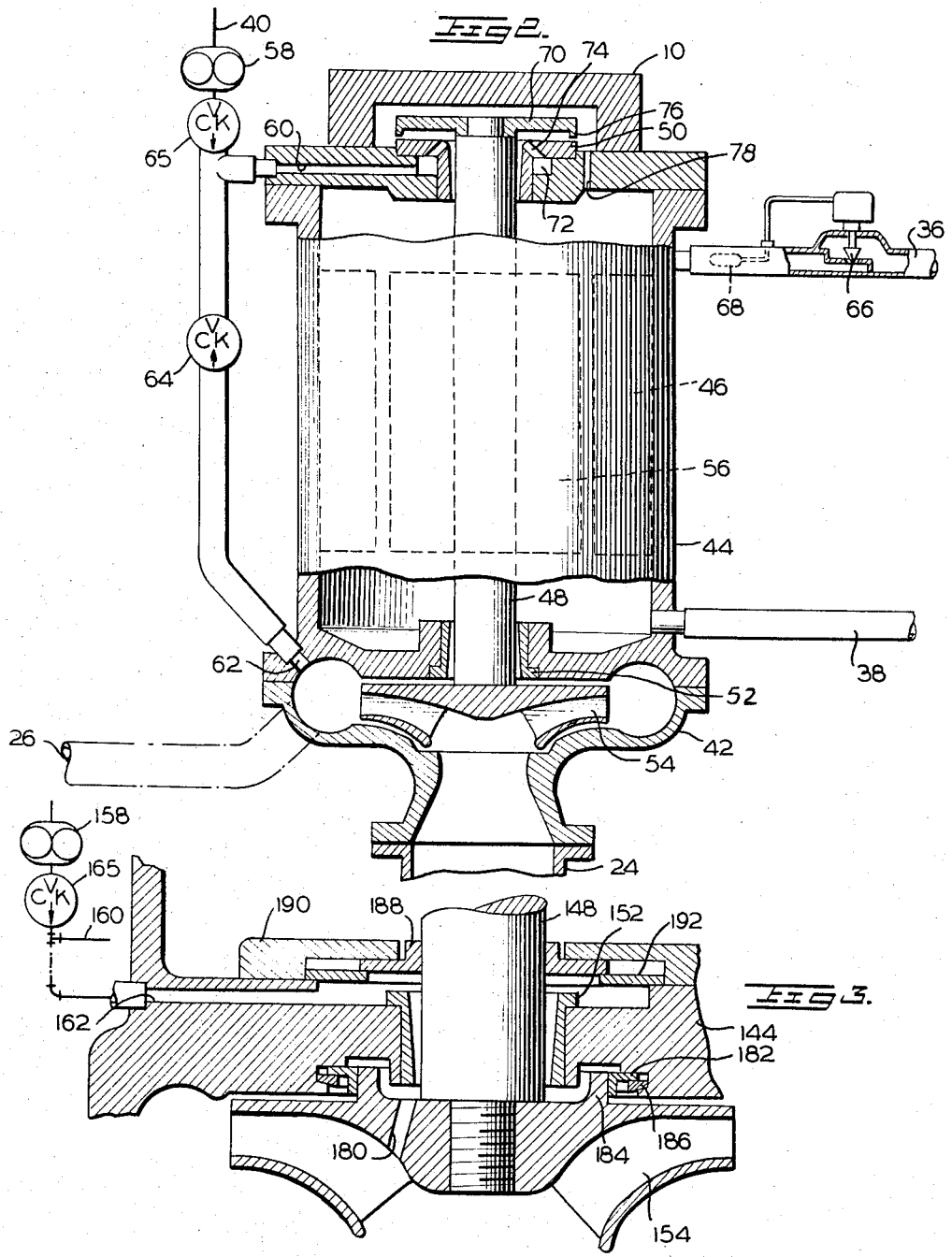

BY Kemon, Palmer, Stuart & Estabrook

ATTORNEYS

Dec. 26, 1967         J. H. ANDERSON         3,359,731
POWER PLANT INCLUDING FLUID MEANS FOR SUPPORTING
ROTATING SHAFT IN A BEARING
Filed Oct. 13, 1966                       4 Sheets-Sheet 4

INVENTOR
JAMES H. ANDERSON

BY *Kenyon, Palmer, Stewart & Estabrook*

ATTORNEYS

United States Patent Office 3,359,731
Patented Dec. 26, 1967

3,359,731
POWER PLANT INCLUDING FLUID MEANS FOR SUPPORTING ROTATING SHAFT IN A BEARING
James H. Anderson, 1615 Hillock Lane,
York, Pa. 17403
Filed Oct. 13, 1966, Ser. No. 612,742
11 Claims. (Cl. 60—64)

This invention is a continuation-in-part of copending application Ser. No. 427,369 filed Jan. 22, 1965, now abandoned, and relates generally to bearing systems and more particularly to bearing systems for rotating electrical machinery which operate in intimate contact with fluid systems, the assemblies having novel means to avoid lubricant contamination of the fluid.

Although devices in accordance with this invention may be utilized in any system in which high purity must be maintained in the fluid thereof, such as refrigeration, gas separation, oxygen supply or production and like processes, the invention is particularly suited for, but not limited to, use in halocarbon power systems such as those disclosed in applicant's copending applications Ser. No. 373,661, filed June 9, 1964, now abandoned, and Ser. No. 402,993, filed Oct. 12, 1964, now Patent No. 3,260,050, relating to Vehicular Power Plants, and Rotary Vapor Generators, respectively.

In the systems described in the above-mentioned applications, a halocarbon compound is utilized as the boiling fluid in a closed-cycle vapor-powered prime mover system. Conventional lubricants are incompatible with the halocarbon fluids used in these systems and, if even minor contamination from the lubricant is encountered, the fluid deteriorates and the system loses its efficiency after a relatively short period of time. These problems are discussed in greater detail in the applicant's copending application Ser. No. 403,234, filed Oct. 12, 1964, now Patent No. 3,258,199, for Shaft Seal and Bearing for Rotating Machinery.

In a system such as that described in the above-mentioned power plant application, it is desirable to incorporate a feed pump between the condenser and the boiler or vapor generator of the system. Although the rotary vapor generator of this system is, in itself, capable of providing or acting as its own feed pump, the following dictates why a separate feed pump may be desirable:

First, since the condensed liquid in the system is at saturation pressure, it is important that the pump for pressurizing the system be located as low as possible therein to take advantage of the maximum available static liquid head. The construction and nature of the rotary vapor generator makes it difficult to locate the pumping action thereof at a low enough level to achieve a maximum, optimum, or even suitable pressure head so that a separate pump is therefore important.

Secondly, since the above-referred-to system utilizes a recuperator to preheat the liquid ahead of the boiler and a stationary preheater ahead of the rotating section of the vapor generator itself, it is necessary to increase the liquid pressure of the fluid to a high enough value so that the liquid phase will not vaporize appreciably in these sections. Since pressure from the pumping action of the vapor generator itself occurs after these points, it is desirable to locate a separate pump ahead of these sections.

Thirdly, from a standpoint of thermodynamic efficiency, it is beneficial to perform the pumping work on the fluid at its lowest possible temperature level therefore the pumping action should be accomplished on the fluid just after the liquid leaves the condenser of the system and before it is heated in the recuperator and preheater.

Fourth, it is preferable not to have to put too large a share of the feed pumping work into the vapor generator rotor since this raises the power requirement of the drive thereof.

Fifth, there is a sealing problem which can be overcome by raising the pressure of the fluid before it enters the boiler because, as can be better understood by reference to the above-mentioned rotary vapor generator application, there would otherwise be a considerable pressure differential across the sliding seal between the incoming liquid chamber and the vapor dome thereof. By raising the incoming pressure to a value close to that of the exhaust pressure in the vapor dome, a lower pressure differential is imposed across the seal and leakage is thereby minimized.

Sixth, if all or most of the pressurizing of the fluid occurs ahead of the boiler, then the rotor speed for the boiler can be determined solely by the required heat transfer conditions therein and it will not thereby have to be limited by the required pump pressure in the system. Prepressurization will also insure proper fluid pressure at the outer periphery of the rotor where the flame temperature is the highest and will insure that the conditions thereat are in excess of saturation permitting vaporization in the inner layer of rotor tubes only.

Although a boiler feed pump for the system disclosed in the aforementioned applications could conceivably be run from a turbine of that system, this would be rather impractical since the pump should preferably be of the variable capacity type developing a nearly constant head over the range of flow from close to zero flow to full capacity. This requirement is best met by a constant speed centrifugal pump, since driving such a pump from a variable speed driving unit, as the turbine necessarily is, would unnecessarily complicate the situation.

For the above reasons, it is desirable to provide a separate motive system for driving the feed pump. This system could consist of a motor-gear drive to provide for high pump speeds in which case the pump shaft could be sealed by the structure described in the applicant's aforementioned application relating to bearing and seal devices for rotating machinery. This system is, however, unnecessarily complicated and costly since the pump has much smaller power requirements than the turbine of the system. A more practical and a simpler arrangement would utilize a high frequency induction motor with the pump impellers or impeller mounted directly on the motor shaft. Such an arrangement in a conventional motor installation would, however, involve contamination of the working fluid of the vapor generator system by the lubricants used in the motor bearings. This invention solves this problem by providing means to lubricate the bearings of a pump-motor system with the fluid to be pumped or a fluid compatible therewith.

An additional problem involved in the aforementioned vehicular power plant which can additionally be solved by the motive system for driving the feed pump is the provision of electrical power to run accessories such as light, air conditioning, etc. while the vehicle is standing still in traffic. If the electro-motive source were connected to the main vehicle turbine, it would be necessary either to run the main turbine continually or provide an excessively large storage batterwy. In addition, the main turbine for traction power must be fairly flexible in speed for the reasons set forth above. It is also desirable to run the main turbine in reverse for braking. Such reverse drive is not desirable for generator drive. As an alternative, the incorporation of a secondary turbine as a motive source driving both the feed pump and an electrical generator, provides both an accessory power source and the motive source for the aforedescribed feed pump.

It is, therefore, an object of this invention to provide a novel electrical machine for operation in intimate relationship with a fluid without lubricant contamination of that fluid by immersing the machinery in either that fluid or fluid compatible therewith and hydrostatically-dynamically lubricating the bearings thereof with the fluid.

It is another object of this invention to provide a machine bearing lubricated by system fluid for use with fluids which do nnot have conventional lubricant properties by incorporating hydrostatic-dynamic bearings in the apparatus.

It is a further object of this invention to provide a new and simple arrangement for lubricating rotary machinery and the like with a non-lubricant fluid.

These and other objects of the invention will be better understood by reference to the following detailed description when considered in light of the accompanying drawings wherein like numerals indicate like parts throughout the figures thereof and wherein:

FIGURE 1 is a schematic representation of a system embodying a motor driven pump in accordance with the invention;

FIGURE 2 is a sectional elevational view of a motor and pump embodying features in accordance with the invention;

FIGURE 3 is a sectional view in detail and partly broken away showing a portion of a motor driven pump embodying the variation of the hydrostatic-dynamic bearing system in accordance with this invention;

Figure 4:
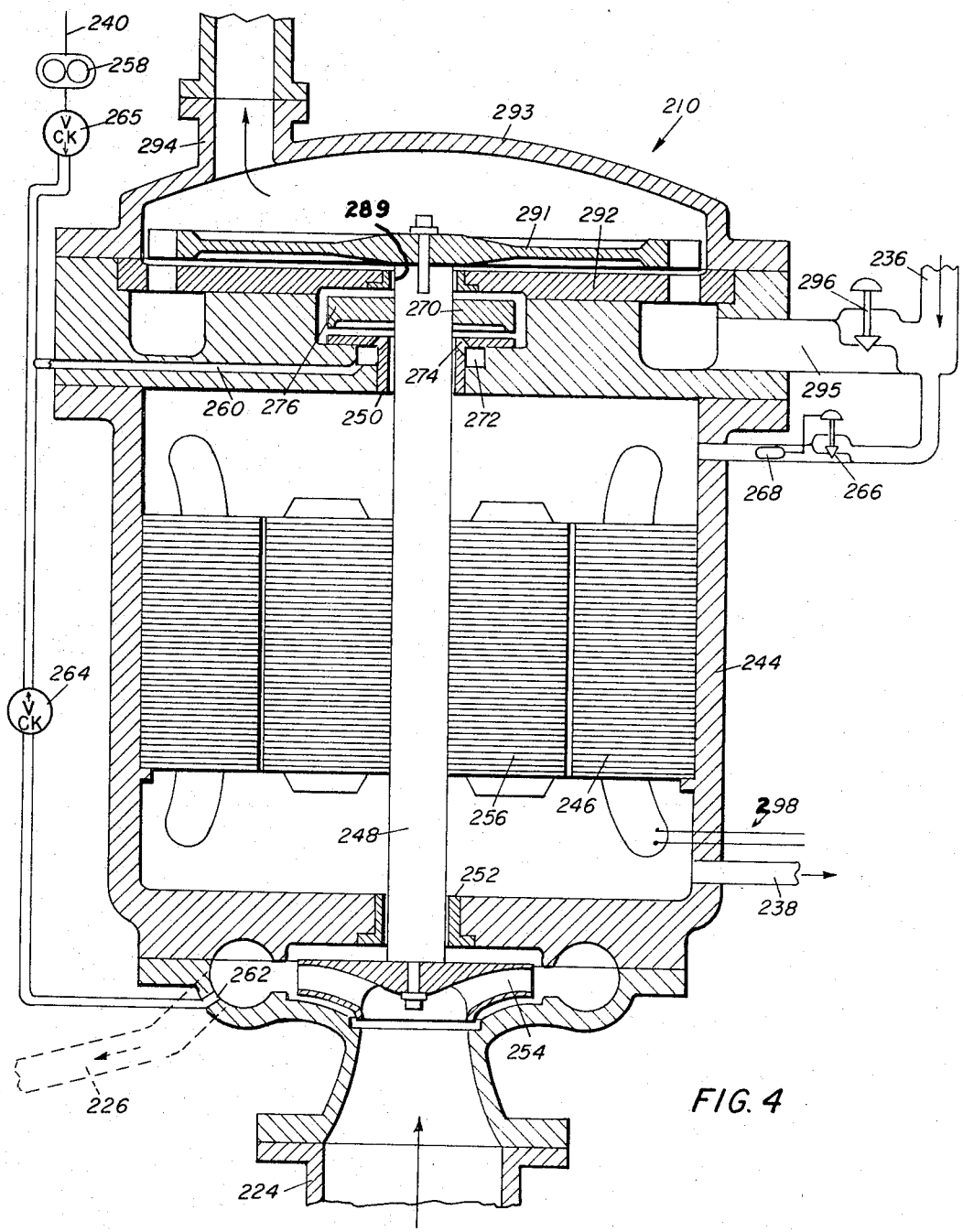
FIGURE 4 is a view similar to FIGURE 2 showing a turbine driven pump-alternator in accordance with this invention.

As has been stated above, the system disclosed herein may be used in any situation where rotating electrical machinery must be used in intimate contact with a fluid and wherein the fluid must be maintained at a high state of purity. Both the motor driven pump and the turbine driven pump-alternator illustrate situations where machinery must operate in intimate contact with a fluid. The pump and the pump-alternator of the applicant's aforementioned halocarbon power system illustrate examples of systems wherein maintenance of high purity in the fluid is required. For these reasons the aforementioned halocarbon system is described in detail below to illustrate a system incorporating the features of this invention but it should be understood that the invention may be used with other than the system specifically described.

Referring to FIGURE 1 of the drawings, a vapor power system incorporating a vapor generator feed pump assembly 10 in accordance with this invention is shown schematically. Briefly the system comprises a vapor generator 12 having a vapor exhaust conduit 14 communicating with the inlet of a power turbine 16. A turbine exhaust conduit 18 conducts vapor from the turbine, through a heat recuperator 20, to a condenser 22 for liquefaction of the turbine exhaust fluid. A condenser discharge conduit 24 conducts liquid from the condenser 22 to the pump 10 from whence it is directed to the recuperator 20 through a pump discharge conduit 26. The liquid is then directed to the vapor generator 12 through the generator feed line 28 to complete the fluid circuit.

The pump assembly 10 is connected to a suitable source of electrical power 30 by wires 32 and 34 and to the vapor generator 12, condenser 22 and condenser discharge line 24 through fluid lines 36, 38 and 40 respectively. The purpose of these connections will be described in more detail below.

Turning now to FIGURE 2 an enlarged sectional view of the pump assembly 10 is shown in side elevation. The pump assembly comprises a pump housing 42 connected to a motor housing 44, the housing having an electrical stator winding 46 mounted around the inner periphery thereof. A vertical motor shaft 48 is rotatably mounted in upper and lower bearings 50 and 52 through the housing 44 and is drivingly connected at the lower end thereof to a centrifugal pump impeller 54 mounted in the pump housing 42. A rotor winding 56 is mounted on the shaft 48 and cooperates with the stator windings 46, when energized by the power source 30 (FIGURE 1), to drive the shaft 48 and the impeller 54 in a conventional manner.

Although the above-described motor may be of any type suitable for the purpose, it is desirable to utilize a high frequency induction motor for this purpose since the direct connection between the pump impeller and the drive will necessitate the use of a high-speed drive. If, for example, a pump operating at about 23,000 revolutions per minute is required, then a two-pole induction motor operation on alternating current having a frequency of 400 cycles per second will be needed. This current could then be supplied from an oscillator furnishing three-phase current from a DC battery or from a rotary AC-DC generator motor set (not shown).

In a conventional lubrication arrangement, the bearings 50 and 52 would be lubricated with a hydrocarbon or similar lubricant. As heretofore stated, such lubricants are incompatible with the halocarbon fluid in the system in which the pump of this invention is to be used and even minute amounts of lubricant contamination, no matter how small, are intolerable. A simple solution to this problem would be to lubricate the bearings of the system with the fluid to be pumped, however, halocarbon fluids are ineffectual for use as lubricants in the conventional manner. It has, therefore, been found to be beneficial in solving this problem to utilize hydrostatic-dynamic bearings for these purposes, the bearings then utilizing the fluid to be pumped to form a supporting film or cushion between the relatively moving parts of the shaft and bearings. This is achieved, in part, by providing a bearing sufficiently greater in diameter than the shaft around which it is disposed so that, upon rotation of the shaft, a fluid film is generated therebetween to furnish hydrodynamic lubrication thereof in the absence of inherent conventional lubricating properties in the fluid.

The hydrodynamic type of lubrication described above, however, exists only when the shaft has reached a suitable rotative speed to generate the cushion. Some provision must therefore be made to lubricate loaded bearings during start up and shut down when such rotative speed is not present. This is accomplished, in this invention, by providing either tapered bores in the bearings 50 and 52 and a cylindrical surface, cylindrical bearings and a tapered shaft surface or shaft and bearings tapering at different angles so that a tapered annulus is formed between the bearings and the shaft 48. In the drawings and the following description the first arrangement is used. With this geometry, the application of fluid pressure to the large end of the tapered annulus, causes a "centering" force to be imposed on the shaft, the force lifting the shaft from mechanical contact with the bearing and providing what may be called hydrostatic lubrication or separation of the parts which will be rotated with respect to each other while the shaft is static or stationary.

The principles governing the above phenomenon are also described in detail in applicant's above-mentioned copending application Ser. No. 403,234, now Patent No. 3,258,199.

The upper end of the shaft 48 has mounted thereon a thrust disc 70 which cooperates with a radially extending portion of the bearing 50 to provide a thrust bearing structure for the shaft. An annular channel 72 is formed around the bearing 50 in communication with the upper conduit 60 and is supplied pressurized fluid therefrom. This fluid flows between the disc 70 and the radially extending portion of the bearing 50 through feeder conduits 74. A downwardly extending rim 76 is provided around the periphery of the thrust disc 70 and engages the radially extending portion of the thrust bearing 50 when the system is not under pressure. This provides an annular space between the thrust disc and the radially extending portion of the thrust bearing 50 when the pump is not in operation.

The above-described hydrostatic lubrication is achieved, in part in the version of FIGURE 2, by conducting the condenser liquid from fluid line 40 through a pressurizing auxiliary pump 58 to the larger ends of the bore in bearing 50 by way of the upper conduits 60. A check valve 65 is disposed in the line 40 between the pump 58 and the conduit 60 for purposes to be described below.

The auxiliary pump 58 may be of any positive displacement type suitable for the purpose such, for example, as a gear or reciprocatory type and is driven from an independently actuated source of power. This pump can also be used for standby and auxiliary purposes to keep liquid in the vapor generator in case of valve leaks during shutdown or even to operate the system under very light load conditions. Prior to starting the main pump system, the auxiliary pump is actuated, automatically or otherwise, thereby feeding the system fluid, under pressure, to the bearing 50 through the conduit 60. Since the shaft 48 is essentially vertical, there is very little radial mechanical load on the shaft so little flow is needed through the bearings 50 and 52. The only positive mechanical contact then needing lubrication at this point is between the thrust disc 70 and the radially extending portion of the bearing 50.

When fluid pressure is furnished through the upper conduit 60, the thrust disc 70 is lifted from the radially extending portion of the bearing 50 as shown allowing flow into the adjacent space of the housing 44. A bleed channel 78 is provided between this upper space and the interior of the housing 44 to provide continuous flow from that space into the housing. This bleed channel is configured with a smaller diameter than required to fully exhaust the flow into the area from upper conduit 60. This causes, when the system is in operation, a pressure rise in the upper space which counteracts or balances upward movement of the thrust disc 70 prior to contact with the upper portion of the housing 44. In this way the thrust disc 70 is lifted by fluid flow therebeneath to take up the weight or the downthrust of the pump and motor but is automatically balanced at some position short of striking the upper portion of the housing 44. The thrust disc 70 could also be designed to generate some additional thrust force by the inclusion of proper pumping lands or vanes on the transverse surfaces thereof.

Once the pump impeller 54 begins rotation, pressure is built up in the housing 42 and fluid is directed through the large end of the bore in bearing 52, the pressure through the tapered annulus causing a centering action of the shaft in the bearing to isolate mechanical contact therebetween. Pressurized fluid from pump 58, directed through conduit 60, also provides similar lubrication for the bearing 50 as long as pump 58 is in operation. A check valve 64 is disposed in the line 40 between the conduit 60 and the conduit 62 to block pressure flow from the pump 58 to the housing 42. The valve 64 is operative to permit flow from the housing 42 through the conduit 62 and 60 to the bearing 50 when pressure has sufficiently built up from the impeller 54 so that the need of pressure from the pump 58 may be terminated and the pump will be entirely self-lubricating. The valve 64 could, of course, be eliminated allowing pump 58 to provide hydrostatic lubrication for both bearings 50 and 52 at the onset of operation is so desired.

The windings 46 and 56 are then energized and the shaft 48 begins rotation until the action of hydrodynamic lubrication takes over or supplements the lubrication action of the bearings. At this point the auxiliary pump 58 may be shut down, in which case the check valve 65 prevents backflow of pressurized fluid from the pump housing 42.

Since discharge of the system fluid in a liquid form through the bearings into the motor housing 44 would be detrimental to the operation of the motor because of collection of liquid in the electrical windings thereof, it is necessary to provide some means to prevent such a collection of liquid. This is accomplished by maintaining a compatible vapor atmosphere in the housing 44 by connecting, in this case, the housing to the vapor generator of the system through the inlet and exhaust fluid lines 36 and 38. Vapor state fluid is maintained in the housing by providing a valve 66 in line 36 which is controlled by a thermostat 68 in the line 36 between the valve and the motor housing 44. By properly designing the thermostat to open the valve when the temperature in the line 36, and therefore the temperature in the housing 44, approaches saturation, the housing will be automatically purged of any liquid condensation and the windings will therefore be maintained in a vapor state atmosphere. It should also be noted that the liquid forced into the bearings through lines 60 and 62 respectively is partially vaporized by the heat of the motor thereby reducing somewhat the amount of liquid introduced into the housing 44.

The invention as thus far described provides a non-contaminating pump for a fluid system, the bearings thereof being lubricated by the pump liquid and the power source thereof being immersed in the operating fluid so that no possible contaminating foreign substances could be introduced into the system from the power source.

One of the problems of the above-described system arises from the fact that there is a rather large downward thrust force from the impeller imposed on the system which must be carried by the thrust disc 70. It is proposed that, if this force is of a sufficient magnitude to cause a serious problem in the pump system, a somewhat more refined bearing, operating on the same principles as set forth above, can be incorporated. Turning now to FIGURE 3 of the drawings, a variation of a bearing in accordance with the invention is shown. In this figure, parts thereof corresponding to parts of the prior embodiment are indicated by like numerals only of the next higher order. A tapered bearing 152, similar to the aforementioned bearings of FIGURE 2, is disposed in a housing 144 in a manner to those described above, only with the taper thereof facing in the opposite direction (i.e. downward). A shaft 148 is disposed therethrough and has a pump impeller 154 mounted on the lower end thereof. Fluid pressure is provided to the larger end of the bearing 152 through the conduit 162 and is exhausted from the bearing downward into the pump impeller section through a bore 180 provided through the impeller 154. In this version, a single check valve 165 is provided between the pump 158 and the bearing feed conduits 160 and 162 so that the pump initially supplies the hydrostatic lubrication for all of the bearings of the system. A ring seal 182 is disposed in the housing 144 in close clearance or sliding contact with a hub 184 disposed on the upper surface of the impeller 154. The seal 182 is contained in the housing 144 by a lock ring 186. This seal reduces leakage from the space between the housing 144 and the impeller 154 into the discharge space from the bearing 152 and also helps to balance the impeller thrust to relieve some of the thrust loading on the thrust disc 70 (FIGURE 2). Another seal 188 is disposed in close clearance or sliding contact around the shaft 148 on the upper side of the bearing 152 and serves to minimize leakage of pressurized liquid from the conduit 162 into the motor space inside the housing. The seal 188 is maintained in place by a retaining disc 190 mounted on the lower surface of the housing 144 with a lock ring 192 disposed in the usual manner. Both of the above-mentioned seals may be of any suitable type common in the art and made, if sliding contact is to be maintained, of some self-lubricating material such as graphite in surface-to-surface sliding contact with the shaft 148. Obviously sealing in these areas is not critical and substantial amounts of leakage therethrough can be tolerated without adversely affecting the system. By proper design of the pressurized surfaces, it is possible with the embodiment of the invention shown in FIGURE 3 to effectively balance out all thrust loads on the shaft thereby reducing the required thrust bearing capacity, flow and power needs. It should be noted at this point that part of the thrust load could also be carried by imposing an upward magnetic thrust from the motor windings on, or by positioning a magnetic coil at one end of the shaft 148.

Although the pump housing shown in the drawings comprises a simple volute-type casing, a diffuser ring outside the pump impeller can be incorporated to eliminate unbalanced radial loads on the bearings, a load which is inherent in an undiffused type of casing.

Referring now to FIGURE 4 of the drawings, a turbine driven pump-generator variant in accordance with this invention is illustrated, parts thereof corresponding to like parts in FIGURE 2 being indicated by like numerals of the next higher order. The primary variation in the embodiment of FIGURE 4 lies in the motive source for driving the pump and, in place of the electric motor of the embodiment of FIGURES 1 and 2, the addition of an electrical power generating machine to provide an electrical power source for accessory equipment. Other than these variations and the structural changes required for incorporation thereof, the pump assembly 210 is substantially identical to the pump assembly 10 of FIGURES 1 and 2. A shaft 248, mounted through upper and lower bearings 250 and 252 respectively and supported in a similar manner to that of the embodiment of FIGURES 1 and 2 with the exception that the uppermost portion thereof is surrounded by a seal 289. The shaft 248 is provided with a turbine 291 mounted on the upper end thereof to provide a driving force for a pump impeller 254 mounted on the lower end. An alternator rotor 256 is mounted intermediate the ends of the shaft 248 to be driven thereby within an alternator stator 246. An annular nozzle plate 292 is mounted around the shaft 248 immediately subjacent the turbine 291 and, through openings around the periphery thereof, directs the flow of the motivating fluid through the blades of the turbine 291. The turbine is enclosed by the turbine housing 293 which is provided with an exhaust opening 294 for discharge of the motive fluid therefrom. The upper end of the housing 244, provided with a motive fluid inlet 295 communicates with an annular chamber disposed in communication with the openings in the nozzle plate 292 to provide transmission of the motive fluid to the nozzle plate. The inlet 295 communicates with the motive fluid source conduit 236 through a speed actuated or governor valve 296 which monitors flow through the conduits to the inlet in accordance with the speed of the shaft 248. The valve 296 functions to control the speed of the alternator-pump since it is desirable to operate these units at a constant speed so that a reasonably constant pressure head from the pump and a reasonably constant frequency in the current produced by the alternator is furnished. For example, the valve could be made to function as a speed control by measuring the electrical frequency output from the alternator and, through a governor, maintain the desired frequency by operating the valve to thereby maintain a constant speed. Such governors are well known in the art, are in wide use for similar purposes and therefore need not be described further herein. Electrical power transmission lines shown generally at 298 are connected to the stator windings 246 of the alternator for transmission of electrical power therefrom.

Figure 5:
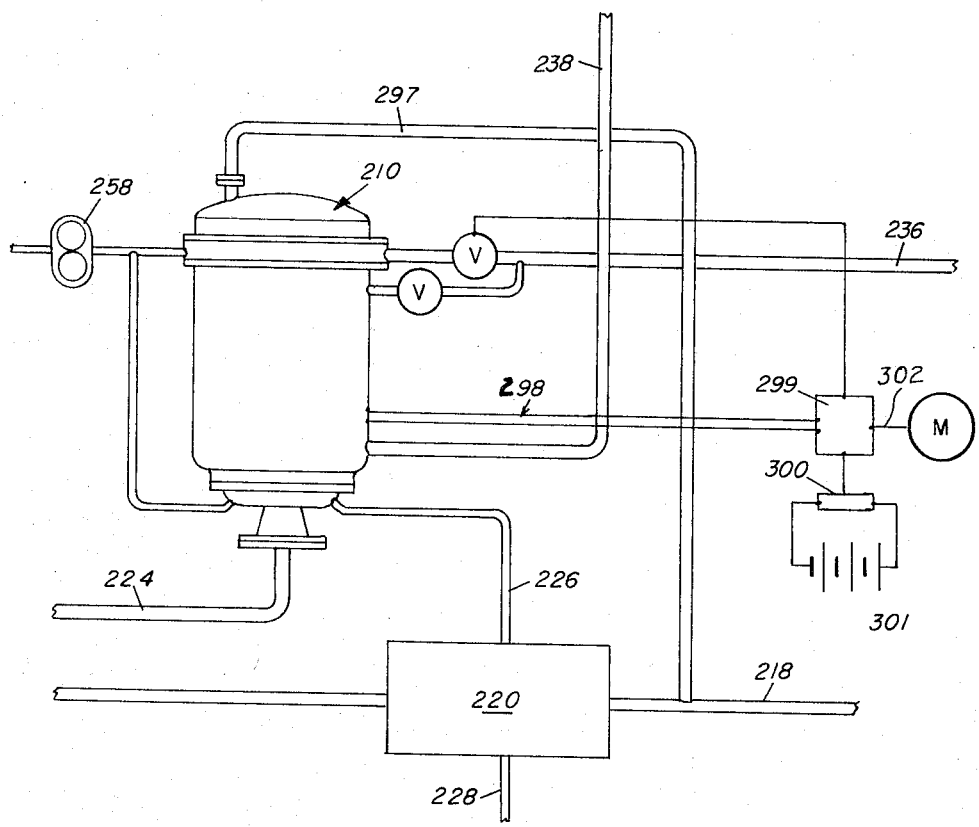
FIGURE 5 is a schematic representation of a portion of the system of FIGURE 1 embodying the turbine-generator variation of FIGURE 4.

Referring now more specifically to FIGURE 5, the electrical connections and piping required to incorporate the alternator-pump 210 into the system of FIGURE 1 are shown schematically. Again in this figure components thereof corresponding to like components in FIGURE 1 are indicated by like numerals of the next higher order. The alternator-pump assembly 210 is provided wtih motivating fluid from the boiler 12 (FIGURE 1) through the conduit 236 as was described in more detail above. The exhaust conduit 297, connected to the turbine exhaust 294 (FIGURE 4) communicates with a main turbine exhaust line 218 for discharge into a recuperator 220. The electrical power transmission lines 298 are connected to an electrical power distribution box 299 from which alternating current may be distributed to alternating current motors through electrical conductors such as that shown at 302. The distribution box 299 is also connected to a rectifier 300 which converts the alternating current to direct current for charging a storage battery 301 and for power supply direct current motors if required.

Since the above-described system will provide both alternating current and direct current for power use in a vehicle, both alternating and direct current motors may be used to the best advantage where needed. For example, alternating current motors may be easily run submerged in a non-conducting operating fluid such as described for the pump embodiment of FIGURES 1 and 2 and may be run at nearly a constant speed as fixed by the frequency of the power supply. These two factors make it desirable to use alternating current motors in the vehicle for air conditioning compressor motor, the motor driving the boiler 12 in FIGURE 1, the power steering pump motor, the condensing fan motor, etc. It is preferable to drive other devices, such as window lift motors, heater fan motors, by direct current motors which may be connected into the electrical distribution system between the rectifier 300 and the storage battery 301.

It is contemplated that the turbine 291 will be driven at a speed of approximately 24,000 r.p.m. This is a suitable operating speed for the pump impeller 254 and could easily provide alternating current at 400 cycles per second, which frequency is suitable for use with the anticipated vehicular accessories.

It should be understood that although the pump has been specifically described in a vertical position, it may be disposed in other orientations. While it is normally preferable to have the shaft located vertically, the same principles can be used to support the shaft in a horizontal position. Normally it is desirable to have the pump in the vertical position so as to maintain the suction as low as possible. It is also desirable to have the static load on the thrust bearing in the stationary position. However, since the radial load of the pump impeller might very well exceed the static load of the weight of the rotor, and gyroscopic forces on the bearings created by a moving or bouncing vehicle would also cause side loads on the bearings, there is a possibility that the rotor might in some cases be desirably located in the horizontal position.

The operation of the fluid bearings 250 and 252, the purging valve 266, pump 258 and check valves 264 and 265 are identical to the operation of the corresponding components in the embodiment of FIGURES 1 and 2 and are therefore described no further at this point.

The embodiments of FIGURES 4 and 5 provide the advantages enumerated in connection with the description of the embodiment of FIGURES 1 and 2 with the additional advantage of providing a continuous source of electrical current which provides a relatively constant frequency and is not dependent on the operation of the main turbine 16 (FIGURE 1).

What has been set forth above is intended as exemplary of embodiments in accordance with the invention to aid those skilled in the art in the practice thereof. It should, therefore, be understood that, within the scope of the appended claims, the invention may be practiced in ways or applications other than as specifically set forth.

What is claimed as new and desired to be protected by Letters Patent of the United States is:

1. In a fluid system, a power assembly for operation in intimate contact with the fluid therein without contamination comprising:
   a rotating electrical machine assembly including rotor and stator windings enclosed by an essentially pressure-tight housing, a shaft through said housing and disposed to rotate said rotor, annular bearings mounted in said housing supporting said shaft, said bearings having a frusto-conical inner surface thereto, said bearings being disposed around said shaft in such a manner that a frusto-conical space is formed therebetween, a minor diameter of said frusto-conical surface being such that said shaft may be supported free from mechanical contact with said bearing;
   means to drive said shaft;
   means to supply fluid compatible with said first-mentioned fluid to the annular space at the major diameter end of said frusto-conical surfaces for passage between said shaft and said bearing under a pressure sufficient to support said shaft in a static condition free from mechanical contact with said bearings, said shaft being fully supported free from mechanical contact with said bearings when rotating by a fluid pressure field generated therearound;
   and means including conduits communicative with said housing to supply and exhaust the vapor phase of a fluid compatible with said first- and second-mentioned fluids to and from said housing to purge liquid collecting therein therefrom.

2. An assembly in accordance with claim 1 wherein a pump is disposed at one end of said shaft, said pump comprising an impeller housing enclosing at least one impeller, means including a fluid inlet and exhaust in said impeller housing connecting said pump to the system to pump the first mentioned fluid for circulation in said system, and means drivingly connecting said impeller to said shaft.

3. An assembly in accordance with claim 1 wherein said means to drive said shaft comprises a source of electrical power connected to said machine assembly to drive said rotor with respect to said stator.

4. An assembly in accordance with claim 1 wherein said means to drive said shaft comprises a turbine mounted on one end thereof, means including a governor to controllably supply a fluid compatible with said first-mentioned fluid to said turbine to drive said shaft;
   and wherein said rotating electrical machine assembly comprises an electrical generator and conductor means connected thereto to transmit electrical power generated thereby.

5. An assembly in accordance with claim 4 wherein said generator produces alternating current.

6. An assembly in accordance with claim 2 wherein the impeller comprises a centrifugal impeller mounted on the lower end of said shaft, said impeler having a substantially flat transverse upper surface thereto and wherein means are associated with at least one of said bearings to support the thrust load of the pump assembly.

7. An assembly in accordance with claim 6 wherein the minor thickness of the space between said shaft and said bearings is disposed inwardly toward the interior of said pressure-tight housing.

8. An assembly in accordance with claim 6 wherein said means to support the thrust load comprises:
   a radially extending thrust flange around the upper end of said upper bearing;
   a thrust disc disposed on the upper end of said shaft to cooperate with said flange, means to mechanically hold said disc and said shaft in spaced relationship to one another when said auxiliary pump is inoperative;
   a bearing housing defining a chamber enclosing said thrust disc to contain fluid passed through the bore of said upper bearing;
   an exhaust conduit to discharge fluid from said chamber, the capacity of said exhaust conduit being sufficiently less than the capacity of the bore in said upper bearing that a sufficient degree of pressure is maintained in said chamber to block contact between said thrust disc and said bearing housing;
   the geometry of said thrust disc and said thrust flange being such that the flow of fluid from the bore in said upper bearing supports said thrust disc free from mechanical contact with said thrust flange.

9. An assembly in accordance with claim 6 wherein the minor thickness of the space between said shaft and said lower bearing is disposed downwardly away from the interior of said pressure-tight housing and wherein said means to support the thrust load comprises:
   a first sliding seal means between said shaft and said pressure-tight housing proximate the major thickness end of the bore space between said shaft and said lower bearing to substantially block fluid from said lower bearing into said pressure-tight housing and a second sliding seal disposed between said pump housing and the transverse upper face of said impeller at a point intermediate said shaft and the periphery of said impeller to substantially block fluid flow from said lower bearing into said impeller housing;
   and a discharge conduit disposed through said impeller to exhaust fluid passed through the bore of said lower bearings, said conduit being substantially aligned longitudinally with shaft and radially disposed on the face of said impeller between said shaft and said second seal.

10. An assembly in accordance with claim 9 wherein said means to support the thrust load of said pump assembly further comprises:
    a radially extending thrust flange around the upper end of said upper bearing;
    a thrust disc disposed on the upper end of said shaft to cooperate with said flange, means to mechanically hold said disc and said shaft in spaced relationship to one another when said auxiliary pump is inoperative;
    a bearing housing defining a chamber enclosing said thrust disc to contain fluid passed through the bore of said upper bearing;
    an exhaust conduit to discharge fluid from said chamber, the capacity of said exhaust conduit being sufficiently less than the capacity of the bore in said upper bearing that a sufficient degree of pressure is maintained in said chamber to block contact between said thrust disc and said bearing housing;
    the geometry of said thrust disc and said thrust flange being such that flow of fluid from the bore in said upper bearing supports said thrust disc from mechanical contact with said thrust flange.

11. A vapor driven prime mover system comprising in succession at least a vapor generator, a vapor driven motor, a vapor-to-liquid condenser and a liquid pump assembly for pumping fluid between said condenser and said vapor generator, said pump assembly comprising:
    a power assembly enclosed by an essentially pressure-tight housing, a shaft disposed through said pressure-tight housing to rotate with said power assembly, bearings mounted in said pressure-tight housing supporting said shaft, said bearings having frusto-conical inner bores therethrough, said bores being disposed around said shaft and configured so that the minor diameter thereof is sufficiently greater than the diameter of said shaft that said shaft may be supported free from mechanical contact therewith;
    a pump comprising an impeller housing enclosing a centrifugal impeller having a substantially flat transverse upper surface thereto, means including a fluid inlet from said condenser and a fluid exhaust to said vapor generator in said impeller housing to transmit fluid therebetween and means drivingly connecting said impeller to said shaft;

means including an independently operated auxiliary pump communicative with said condenser and the major diameter ends of said bearings to supply fluid thereto for passage therethrough under a pressure sufficient to support said shaft in a static condition free from mechanical contact with said bearings, said shaft when rotating being supported free from mechanical contact with said bearings by a fluid pressure field generated therebetween;

means associated with at least one of said bearings to support the thrust load of the pump assembly;

and means including a conduit between said vapor generator and said motor housing to supply the vapor to said housing and a conduit communicative with said housing and said condenser to exhaust fluid in said pressure-tight housing therefrom, to purge liquid collecting in said pressure-tight housing therefrom and valve means including a thermostatic operator in said first conduit to purge said motor housing according to the temperature.

No references cited.

MARTIN P. SCHWADRON, *Primary Examiner.*

ROBERT R. BUNEVICH, *Examiner.*